UNITED STATES PATENT OFFICE.

FREDERICK M. BECKET, OF NIAGARA FALLS, NEW YORK, ASSIGNOR TO ELECTRO METALLURGICAL COMPANY, A CORPORATION OF WEST VIRGINIA.

PROCESS OF PRODUCING FERRO-VANADIUM.

No. 866,562.     Specification of Letters Patent.     Patented Sept. 17, 1907.

Application filed June 12, 1907. Serial No. 378,581.

*To all whom it may concern:*

Be it known that I, FREDERICK M. BECKET, a subject of the King of Great Britain, residing at Niagara Falls, in the county of Niagara and State of New York, have invented certain new and useful Improvements in Processes of Producing Ferro-Vanadium, of which the following is a specification.

According to this process, vanadium ores, for example oxids or roasted sulfids, or concentrates therefrom are reduced in the presence of iron, preferably by the use of silicon or a silicon alloy, aluminium or an aluminium alloy, silicon carbid, or calcium carbid, the products being commercial ferro-vanadium and a slag containing a compound or compounds of vanadium and also of silicon, if a silicious ore or silicon-containing reducing agent are used. The slag is then smelted in the presence of iron and an excess of a reducing agent, to wit aluminium or an aluminium alloy, silicon or a silicon alloy, silicon carbid, calcium carbid, or, when the slag contains compounds of both vanadium and silicon, sufficient carbon or calcium carbid to reduce both of these metals. The iron may be added as such, or may be derived from the slag, from a ferro-alloy, when used as a reducing agent, or from iron oxid added to the charge. The product of this second stage of the process is ferro-vanadium containing aluminium, if aluminium be employed as reducing agent; or silicon, if either silicon, a silicon alloy, silicon carbid, or carbon or calcium carbid in presence of silicon compounds, be employed. The ferro-vanadium containing silicon or aluminium is then smelted with a vanadium ore or concentrate, whereby a further quantity of vanadium is produced and the silicon or aluminium is substantially eliminated, the products being commercial ferro-vanadium and a slag containing vanadium. This removal of the silicon or aluminium from the ferro-vanadium is preferably effected while the latter is in a molten condition, either in a separate receptacle into which it is tapped, or in the furnace in which the reduction of the slag is effected. The ferro-vanadium containing silicon or aluminium may however be solidified, crushed, mixed with the vanadium ore or concentrate which is to be reduced, and smelted. The slag from the third stage of the operation is then smelted in the presence of iron in the same manner as described in the second stage of the process, and the product is smelted in the manner described in the third stage.

In practice, the second and fourth stages of the process may be combined, the slags from the first and third stages being combined and smelted simultaneously to give a ferro-vanadium containing a residue of the reducing agent, which is treated in the third stage.

I claim:

1. The process of producing ferro-vanadium, which consists in smelting a vanadium compound in the presence of iron and producing ferro-vanadium and a slag containing vanadium, and smelting said slag with an excess of a reducing agent to recover the vanadium therefrom.

2. The process of producing ferro-vanadium, which consists in reducing a vanadium compound in the presence of iron and producing ferro-vanadium and a slag containing vanadium, smelting said slag with an excess of a reducing agent, in the presence of iron, and producing ferro-vanadium containing a residue of the reducing agent, and treating the product to substantially remove said residue.

3. The process of producing ferro-vanadium, which consists in reducing a vanadium compound in the presence of iron and producing ferro-vanadium and a slag containing vanadium, smelting said slag with an excess of a reducing agent, in the presence of iron, and producing ferro-vanadium containing a residue of the reducing agent, and substantially removing said residue by smelting the product with a vanadium compound.

4. The process of producing ferro-vanadium, which consists in reducing a vanadium compound in the presence of iron and producing ferro-vanadium and a slag containing vanadium, smelting said slag with an excess of a metallic reducing agent, in the presence of iron, and producing ferro-vanadium containing a residue of the reducing agent, and treating the product to substantially remove said residue.

5. The process of producing ferro-vanadium, which consists in reducing a vanadium compound in the presence of iron and producing ferro-vanadium and a slag containing vanadium, smelting said slag with an excess of a metallic reducing agent, in the presence of iron, and producing ferro-vanadium containing a residue of the reducing agent, and substantially removing said residue by smelting the product with a vanadium compound.

6. The process of producing ferro-vanadium, which consists in reducing a vanadium compound in the presence of iron and producing ferro-vanadium and a slag containing compounds of vanadium and silicon, reducing said slag in the presence of iron and producing ferro-vanadium containing silicon, and removing the silicon from said ferro-vanadium.

7. The process of producing ferro-vanadium, which consists in reducing a vanadium compound in the presence of iron and producing ferro-vanadium and a slag containing compounds of vanadium and silicon, reducing said slag in the presence of iron and producing ferro-vanadium containing silicon, and removing the silicon from said ferro-vanadium by smelting it with a vanadium compound.

8. The process of producing ferro-vanadium, which consists in reducing a vanadium compound in the presence of iron and producing ferro-vanadium and a slag containing vanadium and silicon compounds, reducing said slag in the presence of iron and producing ferro-vanadium containing silicon, smelting said ferro-vanadium containing silicon with a vanadium compound and producing low-silicon ferro-vanadium and a vanadiferous slag, smelting said slag in the presence of iron and producing ferro-vanadium containing silicon, and removing the silicon from said ferro-vanadium.

9. The process of producing ferro-vanadium, which consists in reducing a vanadium compound in the presence of iron and silicon, thereby producing ferro-vanadium containing silicon, and removing the silicon from said ferro-vanadium.

10. The process of producing ferro-vanadium, which consists in reducing a vanadium compound in the presence of iron and silicon, thereby producing ferro-vanadium containing silicon, and removing the silicon from said ferro-vanadium by smelting it with a vanadium compound.

In testimony whereof, I affix my signature in presence of two witnesses.

FREDERICK M. BECKET.

Witnesses:
EUGENE A. BYRNES,
CHAS. F. RANSOM.